US011353925B2

(12) United States Patent
Lin et al.

(10) Patent No.: US 11,353,925 B2
(45) Date of Patent: Jun. 7, 2022

(54) PORTABLE ELECTRONIC DEVICE

(71) Applicant: PEGATRON CORPORATION, Taipei (TW)

(72) Inventors: Shih-Yao Lin, Taipei (TW); Tsung-Cheng Lin, Taipei (TW); Wen-Chung Wu, Taipei (TW); Tao-Hua Cheng, Taipei (TW); Pei-Yi Lee, Taipei (TW); Chia-Liang Chiang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 17/345,922

(22) Filed: Jun. 11, 2021

(65) Prior Publication Data

US 2022/0026953 A1 Jan. 27, 2022

(30) Foreign Application Priority Data

Jul. 22, 2020 (TW) ................................ 109124817

(51) Int. Cl.
*G06F 1/16* (2006.01)
*G06F 3/02* (2006.01)

(52) U.S. Cl.
CPC ............ *G06F 1/1641* (2013.01); *G06F 1/165* (2013.01); *G06F 3/0221* (2013.01)

(58) Field of Classification Search
CPC ...... G06F 1/1641; G06F 3/0221; G06F 1/165; G06F 3/0227; G06A 1/1647
See application file for complete search history.

(56) References Cited

U.S. PATENT DOCUMENTS

| | | | | |
|---|---|---|---|---|
| 8,035,963 | B2 * | 10/2011 | Ladouceur | G06F 3/03547 361/679.55 |
| 9,110,631 | B2 | 8/2015 | Oakley | |
| 2002/0141146 | A1 * | 10/2002 | Mustoe | G06F 1/1616 361/679.04 |
| 2013/0250492 | A1 | 9/2013 | Wong | |

(Continued)

FOREIGN PATENT DOCUMENTS

| | | | |
|---|---|---|---|
| TW | M470482 | U | 1/2014 |
| TW | I543697 | B | 7/2016 |
| TW | I560540 | B | 12/2016 |

*Primary Examiner* — Michael A Faragalla
*Assistant Examiner* — Sujit Shah
(74) *Attorney, Agent, or Firm* — Muncy, Geissler, Olds & Lowe, P.C.

(57) ABSTRACT

The present disclosure discloses a portable electronic device including a primary display panel, a keyboard module, a secondary display panel, and a support plate. The primary display panel includes a first pivot and a second pivot. The first pivot and the second pivot are disposed at the primary display panel. The keyboard module faces the primary display panel and includes a third pivot. One side of the secondary display panel is connected to the first pivot, and another side is a free side. The secondary display panel is flipped through the first pivot to be overlapped on an upper surface of the keyboard module or to abut against the upper surface at the free side. The support plate is flipped through the second pivot and the third pivot to be overlapped on the bottom surface of the primary display panel or to support the primary display panel.

10 Claims, 5 Drawing Sheets

(56) References Cited

U.S. PATENT DOCUMENTS

| | | | | |
|---|---|---|---|---|
| 2014/0293525 | A1* | 10/2014 | Tomita | G06F 1/1679 361/679.06 |
| 2014/0340843 | A1 | 11/2014 | Huang | |
| 2019/0121399 | A1* | 4/2019 | Ku | G06F 1/1666 |
| 2020/0117284 | A1* | 4/2020 | Kulkarni | G06F 1/1649 |

* cited by examiner

PORTABLE ELECTRONIC DEVICE

CROSS-REFERENCE TO RELATED APPLICATION

This non-provisional application claims priority under 35 U.S.C. § 119(a) to Patent Application No. 109124817 filed in Taiwan, R.O.C. on Jul. 22, 2020, the entire contents of which are hereby incorporated by reference.

BACKGROUND

Technical Field

The present disclosure relates to a portable electronic device, and in particular, to a portable electronic device including a primary display panel and a secondary display panel.

Related Art

With development of technologies, increasing maturation of touch technologies, and improvement of performance of processors, portable electronic devices such as notebook computers and tablet computers can execute more functions. Practitioners that design or manufacture portable electronic devices provide various types of portable electronic devices according to requirements of different users to meet a multi-tasking usage situation.

For some users having drawing requirements, general single-screen portable electronic devices cannot satisfy the multi-tasking situation.

SUMMARY

In view of the above issues, the present disclosure is mainly intended to provide a portable electronic device, to resolve a problem that a conventional portable electronic device cannot satisfy a multi-tasking usage situation.

In order to achieve the above purpose, the present disclosure provides a portable electronic device, which includes a primary display panel, a keyboard module, a secondary display panel, and a support plate. The primary display panel includes a first pivot and a second pivot. The first pivot is disposed at a side of the primary display panel. The second pivot is disposed at a bottom surface of the primary display panel. The keyboard module includes an upper surface. The upper surface faces the primary display panel. A side of the keyboard module includes a third pivot. One side of the secondary display panel is connected to the first pivot, and another other side is a free side. The secondary display panel is flipped through the first pivot to be overlapped on an upper surface of the keyboard module or to abut against the upper surface of the keyboard module at the free side. One side of the support plate is connected to the second pivot, and another side is connected to the third pivot. The support plate is flipped through the second pivot and the third pivot to be overlapped on the bottom surface of the primary display panel or to support the primary display panel.

According to an embodiment of the present disclosure, the secondary display panel is flipped to be overlapped on the upper surface of the keyboard module, and the support plate is flipped to be overlapped on the bottom surface of the primary display panel, so that the portable electronic device presents a folded state.

According to an embodiment of the present disclosure, the secondary display panel and the support plate are disposed adjacent to each other and located between the primary display panel and the keyboard module.

According to an embodiment of the present disclosure, the keyboard module includes an input area. The input area is located on the upper surface and close to a side opposite to the third pivot.

According to an embodiment of the present disclosure, the input area includes a functional module. The functional module is disposed adjacent to the side opposite to the third pivot. When the primary display panel is moved away from the keyboard module and drives the support plate to be flipped to support the primary display panel and drives the secondary display panel to be overlapped on the upper surface of the keyboard module to expose the functional module, the portable electronic device presents a first operating state. When the secondary display panel is overlapped on the upper surface of the keyboard module to expose the input area, the portable electronic device presents a second operating state.

According to an embodiment of the present disclosure, when the primary display panel is moved away from the keyboard module, and the secondary display panel is flipped to abut against the upper surface of the keyboard module at the free side, the portable electronic device presents a third operating state.

According to an embodiment of the present disclosure, the keyboard module includes a first positioning member and a second positioning member. The first positioning member is disposed adjacent to the functional module, and the second positioning member is disposed adjacent to the input area.

According to an embodiment of the present disclosure, when the support plate is flipped to support the primary display panel, the primary display panel abuts the first positioning member to present the first operating state. When the support plate is flipped to support the primary display panel, the primary display panel abuts the second positioning member to present the second operating state. When the secondary display panel is flipped to abut against the second positioning member at the free side, the third operating state is presented.

According to an embodiment of the present disclosure, the first positioning member and the second positioning member each are a groove located on the upper surface of the keyboard module.

According to an embodiment of the present disclosure, the secondary display panel further includes a third positioning member and a fourth positioning member. The third positioning member is close to the first pivot, and the fourth positioning member is disposed at the free side. The third positioning member is selectively connected to the first positioning member or the second positioning member by using a magnetic force, and the fourth positioning member is selectively connected to the second positioning member by using a magnetic force.

According to an embodiment of the present disclosure, the primary display panel further includes a primary display surface. The primary display surface and the bottom surface are located on two opposite sides of the primary display panel. The secondary display panel includes a secondary display surface. When the secondary display panel is overlapped on the upper surface of the keyboard module, the secondary display surface faces the keyboard module. When the secondary display panel abuts against the upper surface of the keyboard module at the free side, the primary display surface is disposed adjacent to the secondary display surface.

Based on the above, the portable electronic device according to the present disclosure includes a primary display panel, a keyboard module, a secondary display panel, and a support plate. The primary display panel is connected to the secondary display panel through a first pivot, and is connected to the support plate through a second pivot. The keyboard module faces the bottom surface of the primary display panel, and is connected to the support plate through a third pivot. By virtue of the three-pivot structure, the portable electronic device can present a folded state and various different operating states to satisfy various requirements of users.

DETAILED DESCRIPTION

In order to allow reviewers to better understand the technical content of the present disclosure, specific preferred embodiments are described as follows.

Figure 1A:
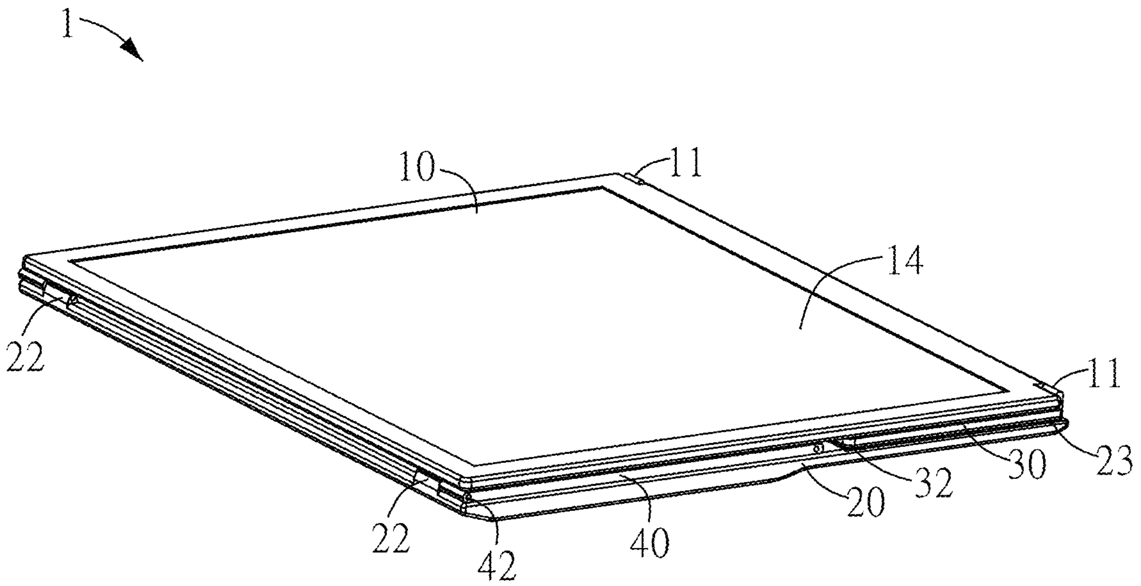
FIG. 1A is a schematic diagram of a portable electronic device in a folded state according to an embodiment of the present disclosure.
Figure 1B:
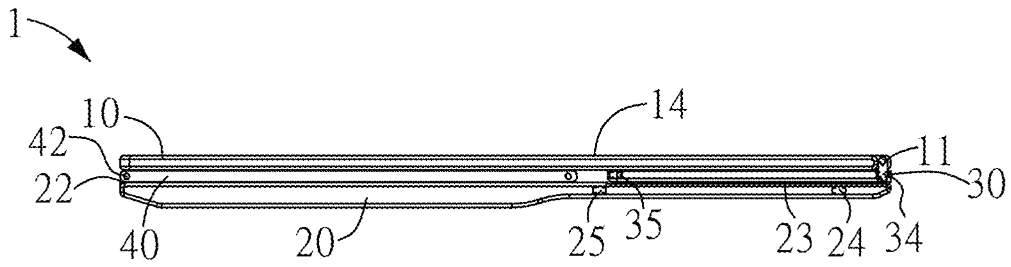
FIG. 1B is a side view of the portable electronic device shown in FIG. 1A.
Figure 2A:
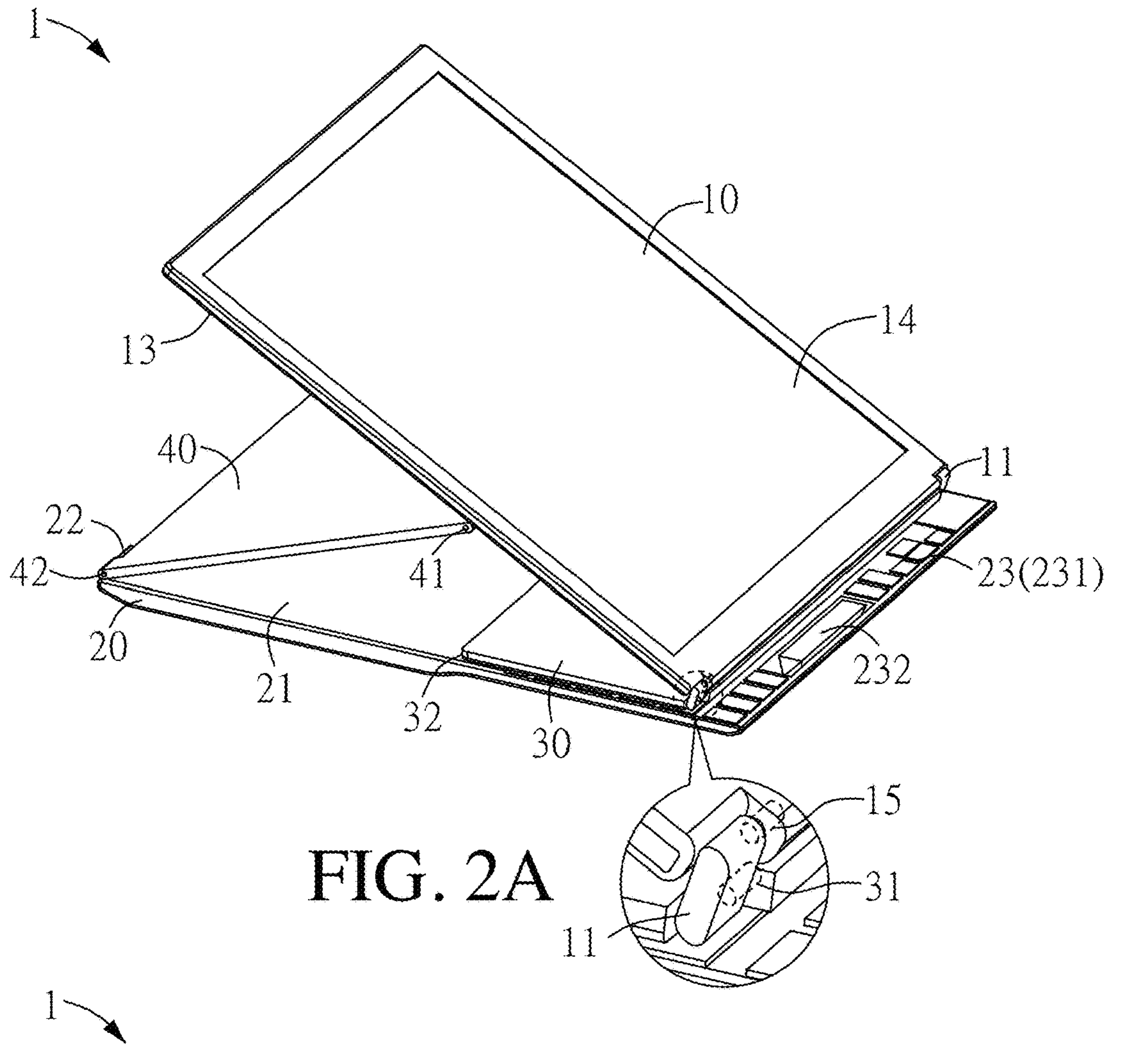
FIG. 2A is a schematic diagram of the portable electronic device shown in FIG. 1A in a first operating state.
Figure 2B:
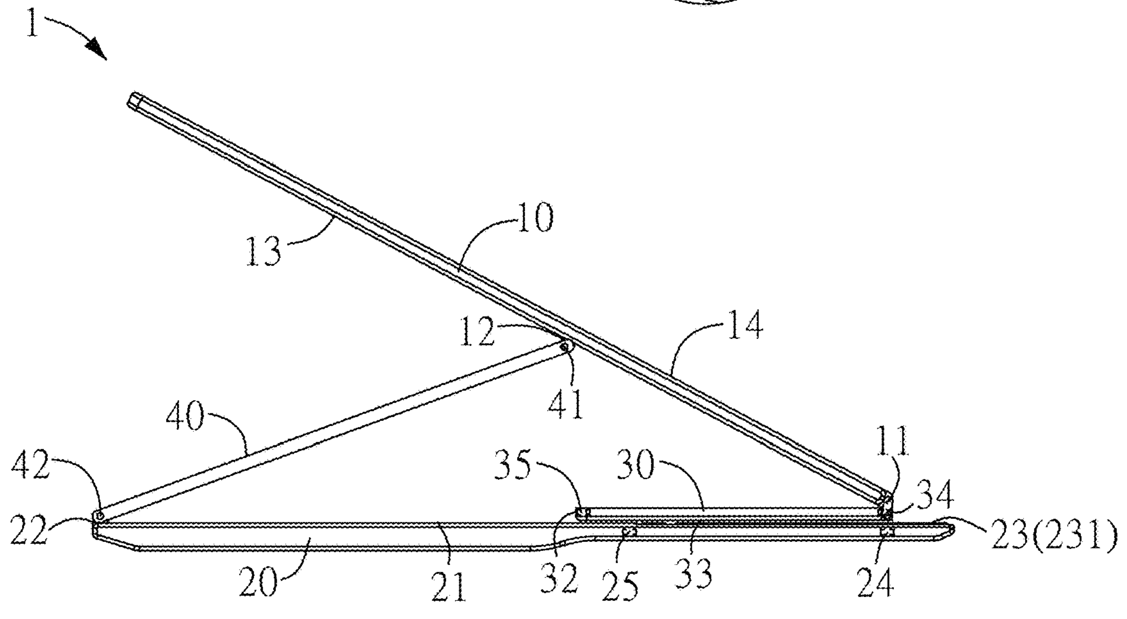
FIG. 2B is a side view of the portable electronic device shown in FIG. 2A.
Figure 3A:
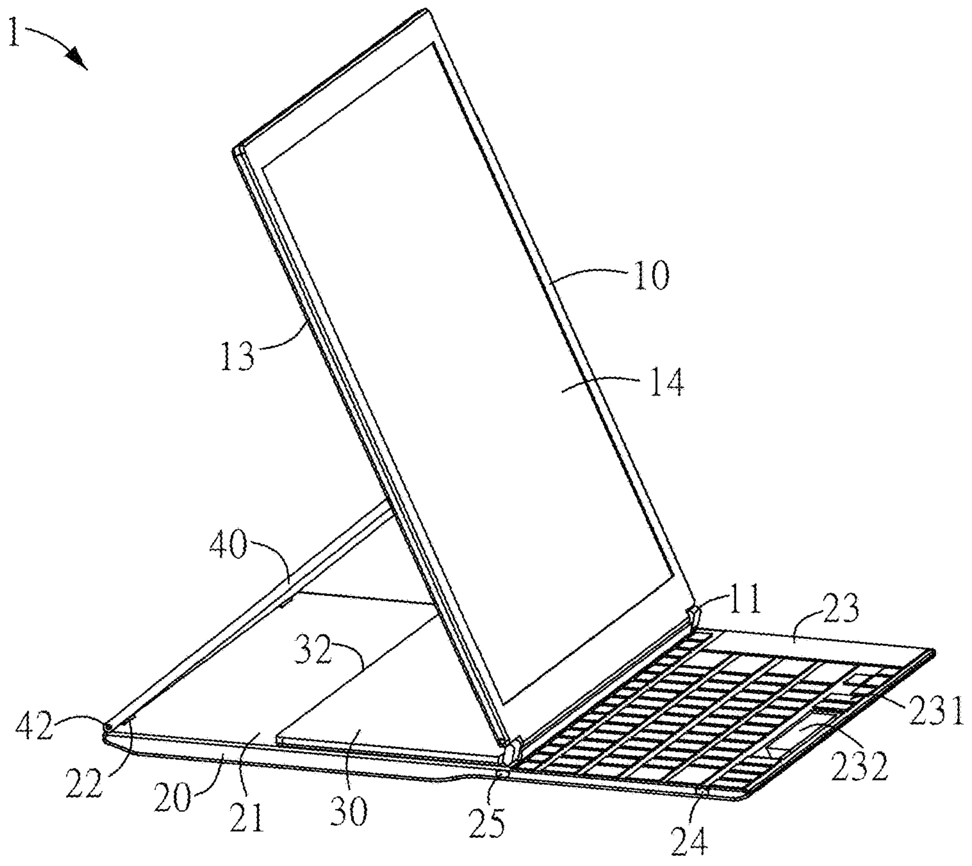
FIG. 3A is a schematic diagram of the portable electronic device shown in FIG. 1A in a second operating state.
Figure 3B:
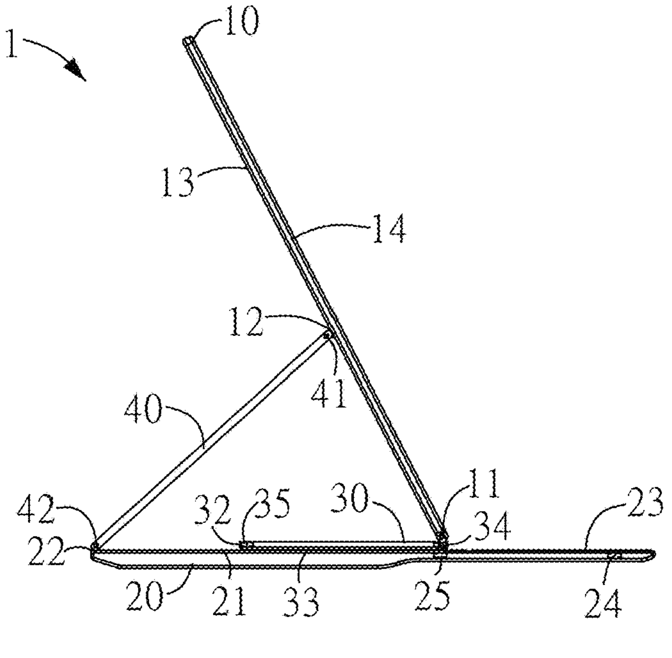
FIG. 3B is a side view of the portable electronic device shown in FIG. 3A.
Figure 4A:
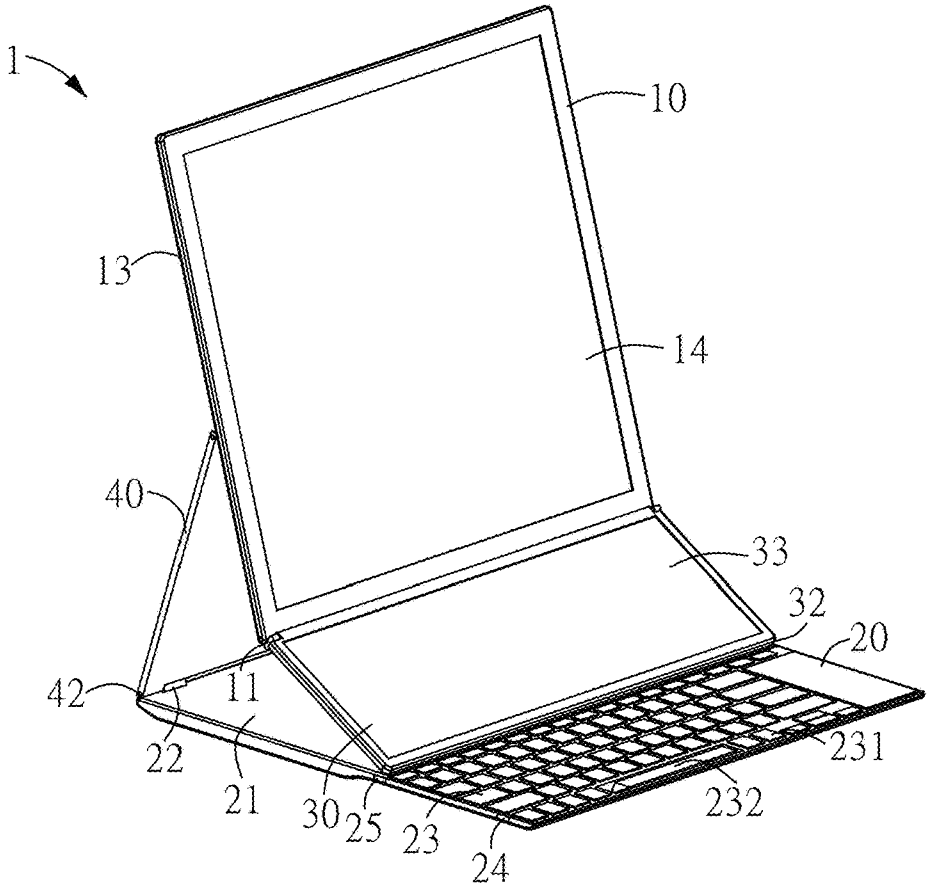
FIG. 4A is a schematic diagram of the portable electronic device shown in FIG. 1A in a third operating state.
Figure 4B:
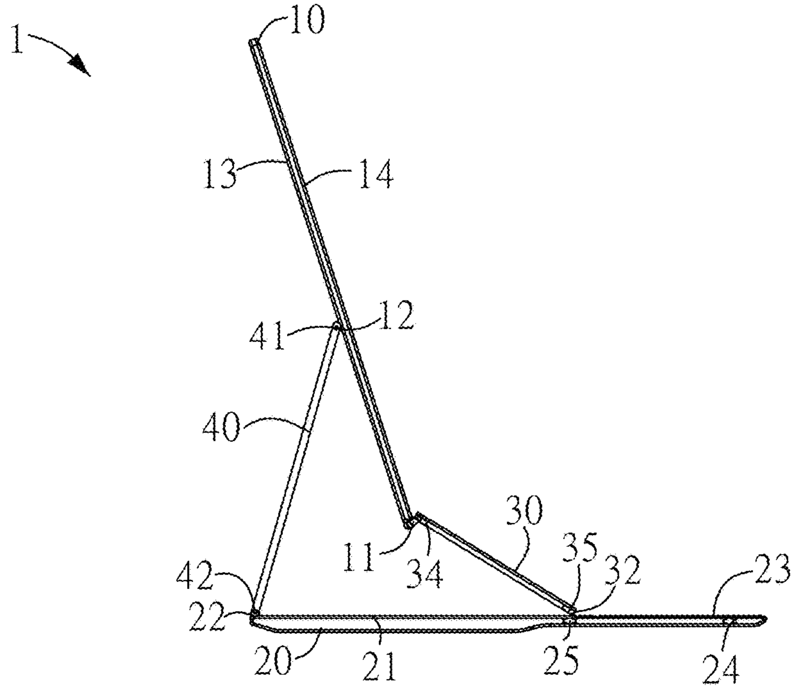
FIG. 4B is a side view of the portable electronic device shown in FIG. 4A.
Figure 5:
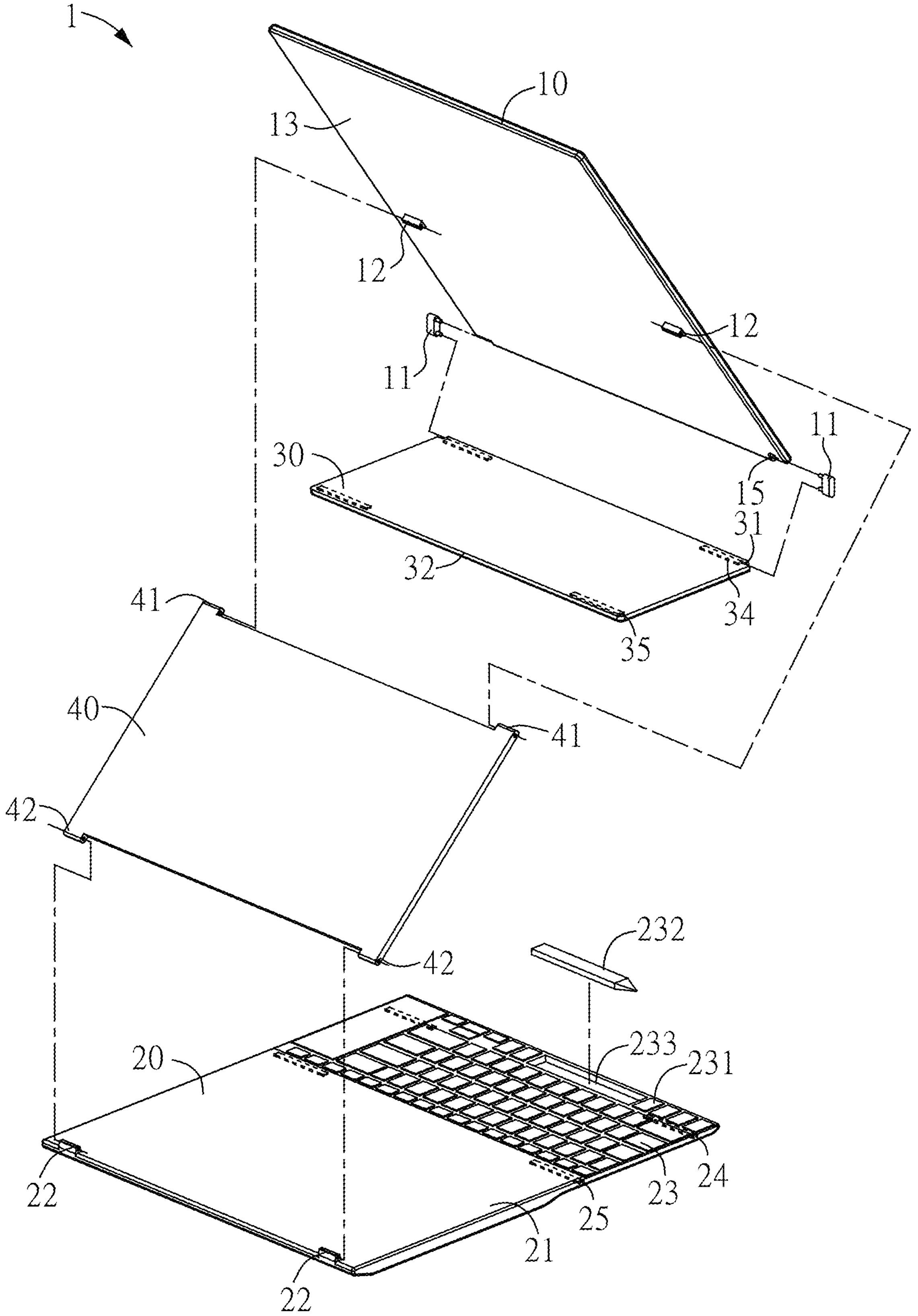
FIG. 5 is a schematic exploded view of the portable electronic device shown in FIG. 1A.

FIG. 1A is a schematic diagram of a portable electronic device in a folded state according to an embodiment of the present disclosure. FIG. 1B is a side view of the portable electronic device shown in FIG. 1A. FIG. 2A is a schematic diagram of the portable electronic device shown in FIG. 1A in a first operating state. FIG. 2B is a side view of the portable electronic device shown in FIG. 2A. FIG. 3A is a schematic diagram of the portable electronic device shown in FIG. 1A in a second operating state. FIG. 3B is a side view of the portable electronic device shown in FIG. 3A. FIG. 4A is a schematic diagram of the portable electronic device shown in FIG. 1A in a third operating state. FIG. 4B is a side view of the portable electronic device shown in FIG. 4A. FIG. 5 is a schematic exploded view of the portable electronic device shown in FIG. 1A. The following description is given with reference to the above drawings.

A portable electronic device 1 in this embodiment includes a primary display panel 10, a keyboard module 20, a secondary display panel 30, and a support plate 40. The primary display panel 10 and the secondary display panel 30 may be touch display devices, such as a tablet computer. Moreover, an area of the secondary display panel 30 is less than that of the primary display panel 10. The primary display panel 10 includes a first pivot 11 and a second pivot 12. The first pivot 11 is disposed on a side of the primary display panel 10, and the second pivot 12 is disposed on a bottom surface 13 of the primary display panel 10 (shown in FIG. 5). Specifically, the first pivot 11 is disposed on a long side of the primary display panel 10. The primary display panel 10 has the bottom surface 13 and a primary display surface 14 opposite to each other. The bottom surface 13 and the primary display surface 14 are located on two opposite sides of the primary display panel 10. The second pivot 12 is disposed on the bottom surface 13, that is, a surface opposite to the primary display surface 14.

The keyboard module 20 faces the bottom surface 13 of the primary display panel 10. Specifically, the keyboard module 20 has an upper surface 21, and the upper surface 21 faces the primary display panel 10. In other words, the keyboard module 20 is located below the primary display panel 10. A space between the primary display panel 10 and the keyboard module 20 in this embodiment is used to accommodate the secondary display panel 30 and the support plate 40. In addition, one side of the keyboard module 20 includes a third pivot 22.

Preferably, the first pivot 11 in this embodiment is a dual hinge that can achieve 360-degree flipping, and is connected to both the primary display panel 10 and the secondary display panel 30. As shown in FIG. 2A, the primary display panel 10 has a pivoting portion 15, and one side of the secondary display panel 30 also has a pivoting portion 31. The pivoting portion 15 and the pivoting portion 31 are jointly connected to the first pivot 11, so that the primary display panel 10 and the secondary display panel 30 can be flipped to form different modes through the first pivot 11. The other side of the secondary display panel 30 is a free side 32. The secondary display panel 30 may be flipped through the first pivot 11 to face the bottom surface 13 of the primary display panel 10 (as shown in FIG. 1A, FIG. 2A, and FIG. 3A) or to cause the free side 32 of the secondary display panel 30 to abut against the upper surface 21 of the keyboard module 20 (as shown in FIG. 4A). Specifically, the secondary display panel 30 has a secondary display surface 33. The secondary display panel 30 may be flipped through the first pivot 11 to be overlapped on the upper surface 21 of the keyboard module 20. In this case, the secondary display panel 30 is located on a position facing to the bottom surface 13 of the primary display panel 10, and the secondary display surface 33 faces the upper surface 21 of the keyboard module 20, as shown in FIG. 2B and FIG. 3B. Moreover, the secondary display panel 30 may also be flipped away from the bottom surface 13 of the primary display panel 10 through the first pivot 11. In this case, the secondary display panel 30 abuts against the upper surface 21 of the keyboard module 20 at the free side 32, and the primary display surface 14 is disposed adjacent to the secondary display surface 33, as shown in FIG. 4A.

Moreover, one side of the support plate 40 has a pivoting portion 41 to be connected to the second pivot 12, and another side of the support plate 40 also has a pivoting portion 42 to be connected to the third pivot 22. By virtue of the second pivot 12 and the third pivot 22, the support plate 40 can be horizontally stacked between the primary display panel 10 and the keyboard module 20, and can support the primary display panel 10 at different angles. In other words, the support plate 40 may be flipped through the second pivot 12 and the third pivot 22 to be overlapped on the bottom surface 13 of the primary display panel 10 (as shown in FIG. 1A), or to support the primary display panel 10 (as shown in FIG. 2A, FIG. 3A, or FIG. 4A). By virtue of the structure of the first pivot 11, the second pivot 12, and the third pivot 22, the portable electronic device 1 can present a folded state and various different operating states to satisfy various requirements of users.

Referring to FIG. 1A and FIG. 1B, the secondary display panel 30 in this embodiment can be flipped through the first pivot 11 to be overlapped on the bottom surface 13 of the primary display panel 10 and the upper surface 21 of the keyboard module 20, and the support plate 40 may be flipped through the second pivot 12 and the third pivot 22 to be overlapped on the bottom surface 13 of the primary display panel 10, so that the portable electronic device 1 presents a folded state. In this case, the secondary display panel 30 and the support plate 40 are disposed adjacent to each other and located between the primary display panel 10 and the keyboard module 20. Preferably, a total area of the secondary display panel 30 and the support plate 40 is less than or equal to an area of the primary display panel 10 (or of the keyboard module 20), so that the secondary display panel 30 and the support plate 40 can be together accommodated under the bottom surface 13 of the primary display panel 10. Moreover, the primary display surface 14 of the primary display panel 10 faces outside (faces upward), so that the portable electronic device 1 in the folded state can be used as a general tablet computer.

Referring to FIG. 3A, FIG. 3B, FIG. 4A, or FIG. 4B, the keyboard module 20 includes an input area 23 and a blank area 43. The upper surface 21 of the keyboard module 20 is divided to the input area 23 and the blank area 43. The input area 23 is close to a side opposite to the third pivot 22, and the blank area 43 is close to the third pivot 22. The blank area 43 is a flat surface without any physical keys. The input area 23 includes assemblies such as physical keys and a touchpad that can perform inputting. In addition, the input area 23 further includes a functional module 231. The functional module 231 is disposed adjacent to the side opposite to the third pivot 22 (that is, a side close to the first pivot 11 in the folded state).

Preferably, the functional module 231 in this embodiment is an input assembly commonly used for executing a drawing mode, for example, physical keys or virtual keys. Moreover, the functional module 231 may further include an accommodating area 233 for a stylus 232 for a user to accommodate the stylus 232, as shown in FIG. 5. Preferably, the functional module 231 may also include assemblies such as a speaker for sound reception and amplification, a microphone, and the like. Referring to FIG. 2A and FIG. 2B, when a user wants to use the drawing mode, the primary display panel 10 may be lifted upward, so that the primary display panel 10 is moved away from the keyboard module 20. When the primary display panel 10 is moved away from the keyboard module 20, the primary display panel 10 drives the support plate 40 to be flipped to support the primary display panel 10 by the second pivot 12 and the pivoting portion 41. In addition, the secondary display panel 30 (in a state of being overlapped on the keyboard module 20) is driven to move on the upper surface 21 of the keyboard module 20. When the first pivot 11 is moved on the input area 23 of the upper surface 21 of the keyboard module 20 to expose the functional module 231, the portable electronic device 1 presents a first operating state (the drawing mode).

In other words, in this embodiment, the primary display panel 10 is supported by the support plate 40, and the secondary display panel 30 is overlapped on a prat of the input area 23 of the upper surface 21 of the keyboard module 20 and the functional module 231 is exposed, which is referred to as the first operating state and is a state of executing the drawing mode. A user may use the portable electronic device 1 in the first operating state as a tablet computer for drawing. Specifically, in the first operating state, an included angle between the primary display panel 10 and the keyboard module 20 is about 30 degrees to 45 degrees, and the secondary display surface 33 faces the input area 23 of the keyboard module 20, but input assemblies (the functional module 231 and the stylus 232 thereof) frequently used for drawing are exposed, so that a user may use the portable electronic device 1 as a drawing board.

Referring to FIG. 3A and FIG. 3B, when the user wants to use a general input mode (that is, an input mode of a general notebook computer), the primary display panel 10 may continue to be lifted, so that the support plate 40 supports the primary display panel 10 at a different angle. For example, the included angle between the primary display panel 10 and the keyboard module 20 is about 60 degrees. In addition, the secondary display panel 30 continues to be moved on the upper surface 21 in the state of being overlapped on the keyboard module 20 until the entire input area 23 is exposed. When the secondary display panel 30 is overlapped on the blank area 43 of the upper surface 21 of the keyboard module 20 and the input area 23 is exposed, the portable electronic device 1 presents a second operating state (the general input mode).

In other words, in this embodiment, the primary display panel 10 is supported by the support plate 40, and the secondary display panel 30 is overlapped on the blank area 43 of the upper surface 21 to expose the input area 23, which is referred to as the second operating state and is the general input mode. At this point, the included angle between the primary display panel 10 and the keyboard module 20 is about 60 degrees, and the secondary display surface 33 faces the keyboard module 20, but the entire input area is exposed. As mentioned above, the input area 23 in this embodiment includes common input assemblies such as physical keys and touchpads, so that a user may use the portable electronic device 1 in the second operating state as a general notebook computer to execute common input functions.

As shown in FIG. 4A and FIG. 4B, the portable electronic device 1 in this embodiment may also be used by the user in a dual-screen mode. Generally, the dual-screen mode may be applied to audio editing or video editing. To use the dual-screen mode, the user may continue to lift the primary display panel 10, so that the first pivot 11 and the pivoting portion 31 are moved away from the upper surface 21 of the keyboard module 20. Then, the secondary display panel 30 is flipped through the first pivot 11, so that the secondary display surface 33 is disposed adjacent to the primary display surface 14, and the free side 32 of the secondary display panel 30 may abut against the upper surface 21 of the keyboard module 20.

When the primary display panel 10 is moved away from the keyboard module 20, and the secondary display panel 30 is flipped to abut against the junction of the blank area 43 and the input area 23 of the upper surface 21 at the free side 32, the portable electronic device 1 presents a third operating state (the dual-screen mode). In other words, in this embodiment, the secondary display panel 30 is flipped in such a state that the free side 32 abuts against the junction of the blank area 43 and the input area 23 of the upper surface 21 of the keyboard module 20, which is referred to as the third operating state, that is, the dual-screen mode is executed. Since the secondary display surface 33 in the dual-screen mode is disposed adjacent to the primary display surface 14, and the secondary display surface 33 is exposed, the user can operate programs such as audio editing or video editing. Preferably, the free side 32 may abut against a side of the input area 23 close to the third pivot 22 to expose the entire input area 23. In the dual-screen mode (the third operating state), the user can still use assemblies such as the physical keyboard and the touchpad in the input area 23.

In addition, regardless of whether the portable electronic device 1 is in the first operating state, the second operating state, or the third operating state, the primary display panel 10 is supported by the support plate 40, so that the primary display panel 10 can be presented at different angles to provide proper angles for use in different operating states.

Preferably, the primary display panel 10 of the portable electronic device 1 in this embodiment may be maintained at positions and angles in different operation modes by using a positioning member. Specifically, the keyboard module 20 in this embodiment further includes a first positioning member 24 and a second positioning member 25. The first positioning member 24 is disposed at the input area 23 adjacent to the functional module 231. The second positioning member 25 is disposed at the junction of the blank area 43 and the input area 23. That is, the second positioning member 25 is located at an edge of the input area 23 and is close to the third pivot 22.

In some embodiments, the first positioning member 24 and the second positioning member 25 each may be a groove. When the support plate 40 is flipped to support the primary display panel 10, and a side (that is, the side having the first pivot 11) of the primary display panel 10 is moved to the first positioning member 24 on the input area 23 of the upper surface 21 of the keyboard module 20, the side of the primary display panel 10 can abut against the first positioning member 24 (the groove) to expose the functional module 231 to present the first operating state (the drawing mode). When the support plate 40 is flipped to support the primary display panel 10, and the side of the primary display panel 10 is moved to the second positioning member 25, the side of the primary display panel 10 can abut against the second positioning member 25 (the groove) to expose the entire input area 23 to present the second operating state (the general input mode). Moreover, when the secondary display panel 30 is flipped to abut against the second positioning member 25 (the groove) at the free side 32, the third operating state (the dual-screen mode) is presented.

In this embodiment, the first positioning member 24 and the second positioning member 25 may be magnets, so that the same positioning effect as that in the above can be achieved by using a magnetic force. Specifically, the secondary display panel 30 in this embodiment further includes a third positioning member 34 and a fourth positioning member 35. The third positioning member 34 is close to the first pivot 11, and the fourth positioning member 35 is disposed at the free side 32. Therefore, when the side of the primary display panel 10 is moved to the first positioning member 24, and the third positioning member 34 and the first positioning member 24 attract each other, the first operating state is presented and maintained, as shown in FIG. 2B. When the side of the primary display panel 10 is moved to the second positioning member 25, and the third positioning member 34 and the second positioning member 25 attract each other, the second operating state is presented and maintained, as shown in FIG. 3B. Moreover, when the secondary display panel 30 is flipped to abut against the second positioning member 25 at the free side 32, and the fourth positioning member 35 and the second positioning member 25 attract each other, the third operating state is presented and maintained, as shown in FIG. 4B. In short, the third positioning member 34 is selectively connected to the first positioning member 24 or the second positioning member 25 by using a magnetic force, and the fourth positioning member 35 is selectively connected to the second positioning member 25 by using a magnetic force, so that the portable electronic device 1 can be maintained in the first operating state, the second operating state, or the third operating state.

Based on the above, the portable electronic device according to the present disclosure includes a primary display panel, a keyboard module, a secondary display panel, and a support plate. The primary display panel is connected to the secondary display panel through a first pivot, and is connected to the support plate through a second pivot. The keyboard module faces the bottom surface of the primary display panel, and is connected to the support plate through a third pivot. Thus, the portable electronic device can present a folded state and various different operating states to satisfy various requirements of users.

For example, the secondary display panel and the support plate can be folded between the primary display panel and the keyboard module, so that the portable electronic device can present a folded state and used as a general tablet computer. Alternatively, the support plate supports the primary display panel at different angles, so that the portable electronic device can be used as a drawing board or a general notebook computer. Alternatively, the secondary display panel is flipped in such a way that the portable electronic device can be used as a dual-screen computer.

It should be noted that the above embodiments are merely examples for description, and the scope of rights claimed in the present disclosure should be subject to the scope of the patent application, rather than limited to the above embodiments.

What is claimed is:

1. A portable electronic device, comprising:
a primary display panel comprising:
a first pivot disposed at a side of the primary display panel; and
a second pivot disposed at a bottom surface of the primary display panel;
a keyboard module comprising an upper surface, wherein the upper surface faces the primary display panel, a side of the keyboard module comprises a third pivot, the keyboard module further comprises an input area, the input area comprises a functional module, and the functional module is disposed adjacent to the side opposite to the third pivot;
a secondary display panel, wherein one side of the secondary display panel is connected to the first pivot, another side of the secondary display panel is a free side, and the secondary display panel is flipped through the first pivot to be overlapped on the upper surface of the keyboard module or to abut against the upper surface of the keyboard module at the free side; and
a support plate, wherein one side of the support plate is connected to the second pivot, another side of the support plate is connected to the third pivot, and the support plate is flipped through the second pivot and the third pivot to be overlapped on the bottom surface of the primary display panel or to support the primary display panel, wherein
when the primary display panel is moved away from the keyboard module and drives the support plate to be flipped to support the primary display panel and drives the secondary display panel to be overlapped on the upper surface of the keyboard module to expose the functional module, the portable electronic device presents a first operating state, and when the secondary display panel is overlapped on the upper surface of the keyboard module to expose the input area, the portable electronic device presents a second operating state.

2. The portable electronic device according to claim 1, wherein the secondary display panel is flipped to be overlapped on the upper surface of the keyboard module, and the support plate is flipped to be overlapped on the bottom surface of the primary display panel, so that the portable electronic device presents a folded state.

3. The portable electronic device according to claim 2, wherein the secondary display panel and the support plate are disposed adjacent to each other and are located between the primary display panel and the keyboard module.

4. The portable electronic device according to claim 3, wherein the input area is located on the upper surface and close to a side opposite to the third pivot.

5. The portable electronic device according to claim 1, wherein when the primary display panel is moved away from the keyboard module, and the secondary display panel is flipped to abut against the upper surface of the keyboard module at the free side, the portable electronic device presents a third operating state.

6. The portable electronic device according to claim 5, wherein the keyboard module comprises a first positioning member and a second positioning member, wherein the first positioning member is disposed adjacent to the functional module, and the second positioning member is disposed adjacent to the input area.

7. The portable electronic device according to claim 6, wherein when the support plate is flipped to support the primary display panel, the primary display panel abuts against the first positioning member to present the first operating state; when the support plate is flipped to support the primary display panel, the primary display panel abuts against the second positioning member to present the second operating state; and when the secondary display panel is flipped to abut against the second positioning member at the free side, the third operating state is presented.

8. The portable electronic device according to claim 6, wherein the first positioning member and the second positioning member each are a groove located on the upper surface of the keyboard module.

9. The portable electronic device according to claim 6, wherein the secondary display panel further comprises a third positioning member and a fourth positioning member, wherein the third positioning member is close to the first pivot, the fourth positioning member is disposed at the free side, the third positioning member is selectively connected to the first positioning member or the second positioning member by using a magnetic force, and the fourth positioning member is selectively connected to the second positioning member by using a magnetic force.

10. The portable electronic device according to claim 1, wherein the primary display panel further comprises a primary display surface, the primary display surface and the bottom surface are located on two opposite sides of the primary display panel, the secondary display panel comprises a secondary display surface, when the secondary display panel is overlapped on the upper surface of the keyboard module, the secondary display surface faces the keyboard module, and when the secondary display panel abuts against the upper surface of the keyboard module at the free side, the primary display surface is disposed adjacent to the secondary display surface.

* * * * *